A. ROBERTSON.
GRAFTING MACHINE.
APPLICATION FILED AUG. 29, 1911.
1,023,038.
Patented Apr. 9, 1912.
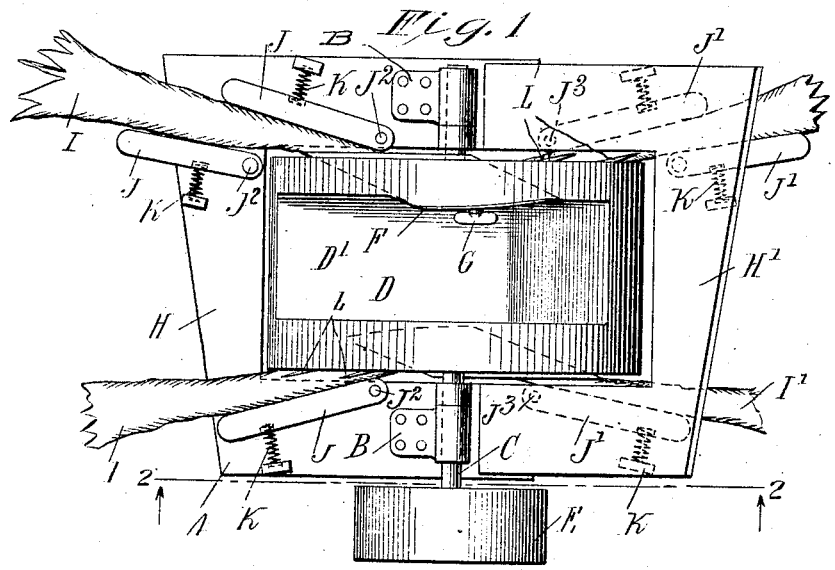
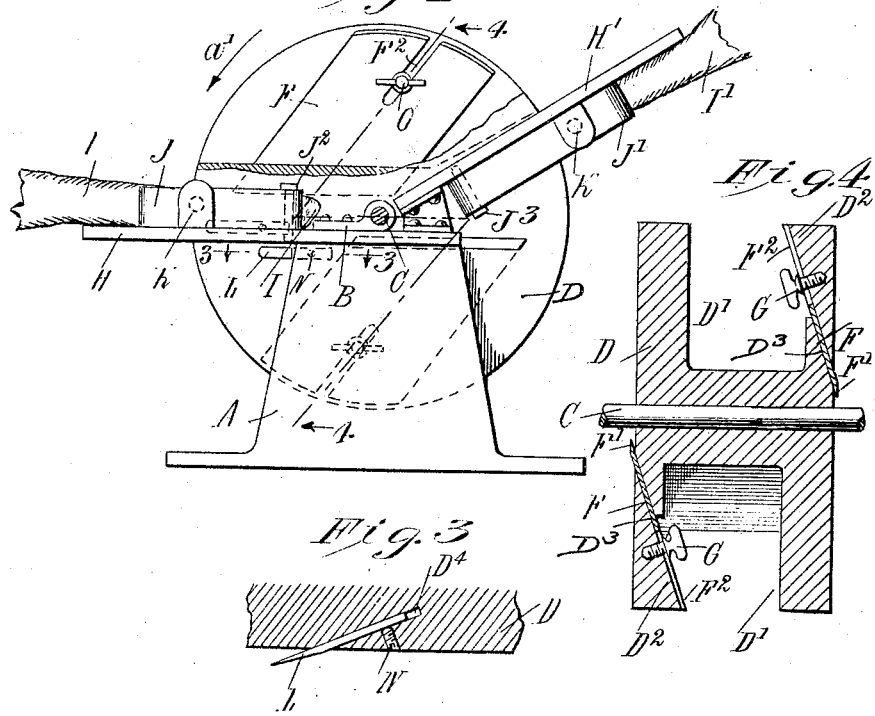
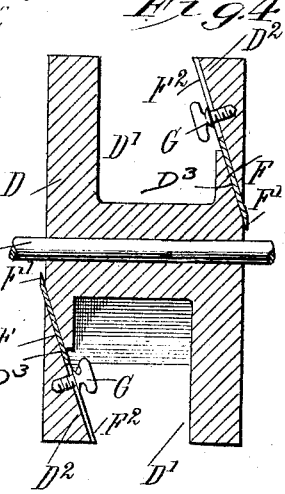
WITNESSES
INVENTOR
Alexander Robertson
BY
ATTORNEYS

UNITED STATES PATENT OFFICE.

ALEXANDER ROBERTSON, OF HARRISON HOT SPRINGS, BRITISH COLUMBIA, CANADA.

GRAFTING-MACHINE.

1,023,038.  Specification of Letters Patent.  Patented Apr. 9, 1912.

Application filed August 29, 1911. Serial No. 646,602.

*To all whom it may concern:*

Be it known that I, ALEXANDER ROBERTSON, a citizen of the British Empire, and a resident of Harrison Hot Springs, in the Province of British Columbia and Dominion of Canada, have invented a new and Improved Grafting-Machine, of which the following is a full, clear, and exact description.

The invention relates to horticulture, and its object is to provide a new and improved grafting machine, more especially designed for use in nurseries and the like, and arranged to cut the graft or scion diagonally with a shearing cut to prevent bruising or otherwise injuring the graft or scion.

For the purpose mentioned, use is made of a rotary cutter head provided with beveling knives, a table for the grafts or scions to rest on, and guides on the table at an angle to the cutting edges of the knives to guide the grafts or scions.

A practical embodiment of the invention is represented in the accompanying drawings forming a part of this specification, in which similar characters of reference indicate corresponding parts in all the views.

Figure 1 is a plan view of the grafting machine; Fig. 2 is a sectional side elevation of the same on the line 2—2 of Fig. 1 and showing part of the cutter head broken out; Fig. 3 is an enlarged sectional plan view of the cutter head showing more particularly a slitting knife, the section being on the line 3—3 of Fig. 2; and Fig. 4 is a cross section of the cutter head on the line 4—4 of Fig. 2.

On a suitably constructed stand A are mounted bearings B, in which is journaled a shaft C carrying a cutter head D and a pulley E connected by a belt with other machinery for imparting a continuous rotary motion to the shaft C and the cutter head D, to rotate the latter in the direction of the arrow $a^1$ shown in Fig. 2. The cutter head D is provided in its peripheral face with cut-out portions $D^1$ forming beveled backs $D^2$, provided with slots leading to the opposite end faces of the cutter head D, as plainly indicated in Fig. 4. On each of the beveled backs $D^2$ is adjustably secured a beveling knife F by the use of a screw G or other fastening device, the beveling knife F projecting through one of the slots of the cutter-head before mentioned and having its cutting edge $F^1$ projecting beyond the corresponding end face of the cutter head D. Each beveling knife F is also provided with a slot $F^2$ for the passage of the screw G so as to permit of adjusting the knife F with a view to project the cutting edge $F^1$ the desired distance beyond the face of the cutter head D.

On the stand A are arranged tables H and $H^1$ for supporting grafts or scions I or $I^1$ adapted to be guided to the cutting edges $F^1$ by guides J and $J^1$ pivoted at their inner ends at $J^2$, $J^3$ to the tables H, $H^1$, the outer free ends of the guides being pressed in an inward direction by springs K, as will be readily understood by reference to the drawings. The tables H and $H^1$ extend in opposite directions from the shaft C and the guides J are on the top of the table H together with the scions or grafts I to be treated, while the guides $J^1$ are on the under side of the table $H^1$ together with the grafts or scions $I^1$ to be treated.

The cutter head D is also provided on each face with one or more slitting knives L adjustably secured in corresponding recesses $D^4$ formed in the cutter head, the slitting knives fastened in place after the desired adjustment is made by set screws N screwing in the cutter head, as indicated in Fig. 3. In practice, both end faces of the cutter head D are provided with beveling knives F and slitting knives L, and the two guides J and $J^1$ are provided for each table H and $H^1$, so that four grafts or scions may be treated at the same time, that is, the grafts or scions can be gradually fed along the guides J toward the knives F and L, so as to cause the said knives to bevel the inner ends of the grafts or scions I or $I^1$, and at the same time provide the same with slits for forming splices.

It is understood that the grafts or scions are inserted endwise in the machine, and as the cutter head rotates at a high rate of speed (say 1500 to 2000 revolutions per minute), the grafts or scions are gradually pared or sheared and hence are not liable to be bruised or otherwise injured.

Having thus described my invention, I claim as new and desire to secure by Letters Patent:—

1. A grafting machine, comprising a vertically disposed revoluble cutter-head, substantially cylindrical in form and having flat ends, knives mounted in said cutter-head to project from its said ends, and a support, and means to guide a graft or scion angularly toward the said ends of the cutter-head.

2. A grafting machine, comprising a vertically revoluble cutter head provided at its end face with a slot, a beveling knife held on the said head and having its cutting edge projecting through the said slot beyond the end face of the cutter head, means for supporting a graft or scion and guiding it to the said cutting edge, and slitting knives held on the end of the cutter head and having their cutting edges at an angle to the face of the head.

3. A grafting machine, comprising a revoluble cutter head, having each face provided with a slot leading to a beveled back on the cutter head, a beveling knife adjustably secured to each of the said backs and having its cutting edge projecting through the respective slot and beyond the respective end face of the cutter head, a fixed table for the graft or scion to rest on, and a guide pivoted on the said table and arranged at an angle to the cutting edge of the knife.

4. A grafting machine, comprising a revoluble cutter head having each face provided with a slot leading to a beveled back on the cutter head, a beveling knife adjustably secured to each of the said backs and having its cutting edge projecting through the respective slot and beyond the respective end face of the cutter head, a fixed table for the graft or scion to rest on, a guide pivoted on the said table and arranged at an angle to the cutting edge of the knife, and a spring pressing the free end of the guide inward toward the cutter head face.

In testimony whereof I have signed my name to this specification in the presence of two subscribing witnesses.

ALEXANDER ROBERTSON.

Witnesses:
A. E. GALPIN,
OZEO C. GOULD.